United States Patent
Sidlauskas

[11] 3,762,744
[45] Oct. 2, 1973

[54] ORBIT MOBILE

[76] Inventor: Donald Michael Sidlauskas, 3950 N.W. 32nd Ter., Fort Lauderdale, Fla. 33309

[22] Filed: Sept. 29, 1971

[21] Appl. No.: 184,760

[52] U.S. Cl. .............................................. 280/207
[51] Int. Cl. ............................................. B62k 1/00
[58] Field of Search ......................... 280/206, 207; 272/1 R, 1 B; 115/20

[56] References Cited
UNITED STATES PATENTS

| 91,829 | 6/1869 | Dillaha | 280/207 |
|---|---|---|---|
| 92,528 | 7/1869 | Hemmings | 280/207 |
| 948,859 | 2/1910 | Jackulvis | 280/207 |
| 1,673,774 | 6/1928 | Moore | 280/207 |
| 3,380,755 | 4/1968 | Pound | 280/207 |

Primary Examiner—Kenneth H. Betts

[57] ABSTRACT

A novel type of vehicle for transporting a person and giving a new kind of ride, the device consisting of a circular ring for travel on the ground, and having a toothed track on its inner side on which a foot pedal operated scooter travels and on which a person sits, so that the scooter and person are located inside the circular ring; the travel of the scooter in the ring causing the ring to move.

1 Claim, 2 Drawing Figures

INVENTOR
DONALD M. SIDLAUSKAS

ORBIT MOBILE

This invention relates generally to vehicles.

A principal object of the present invention is to provide a vehicle that travels within a closed ring so to cause the ring to travel along a ground.

Another object is to provide an orbit mobile which accordingly can serve as an amusement ride for entertaining children or adults.

Another object is to provide an orbit mobile which alternately can be used for practical purposes and which would have the advantage of having a relatively very large wheel so that it is adaptable for travel over a rough or soft ground, such as would not be possible for a vehicle with small wheels.

Still another object is to provide an orbit mobile which could be designed with a floatable ring provided with paddles so it could travel on a surface of water.

Other objects are to provide an orbit mobile which is simple in design, inexpensive to manufacture, rugged in construction, easy to use, and efficient in operation.

These and other objects will be readily apparent upon a study of the following specification and the accompanying drawing, wherein.

Figure 1:
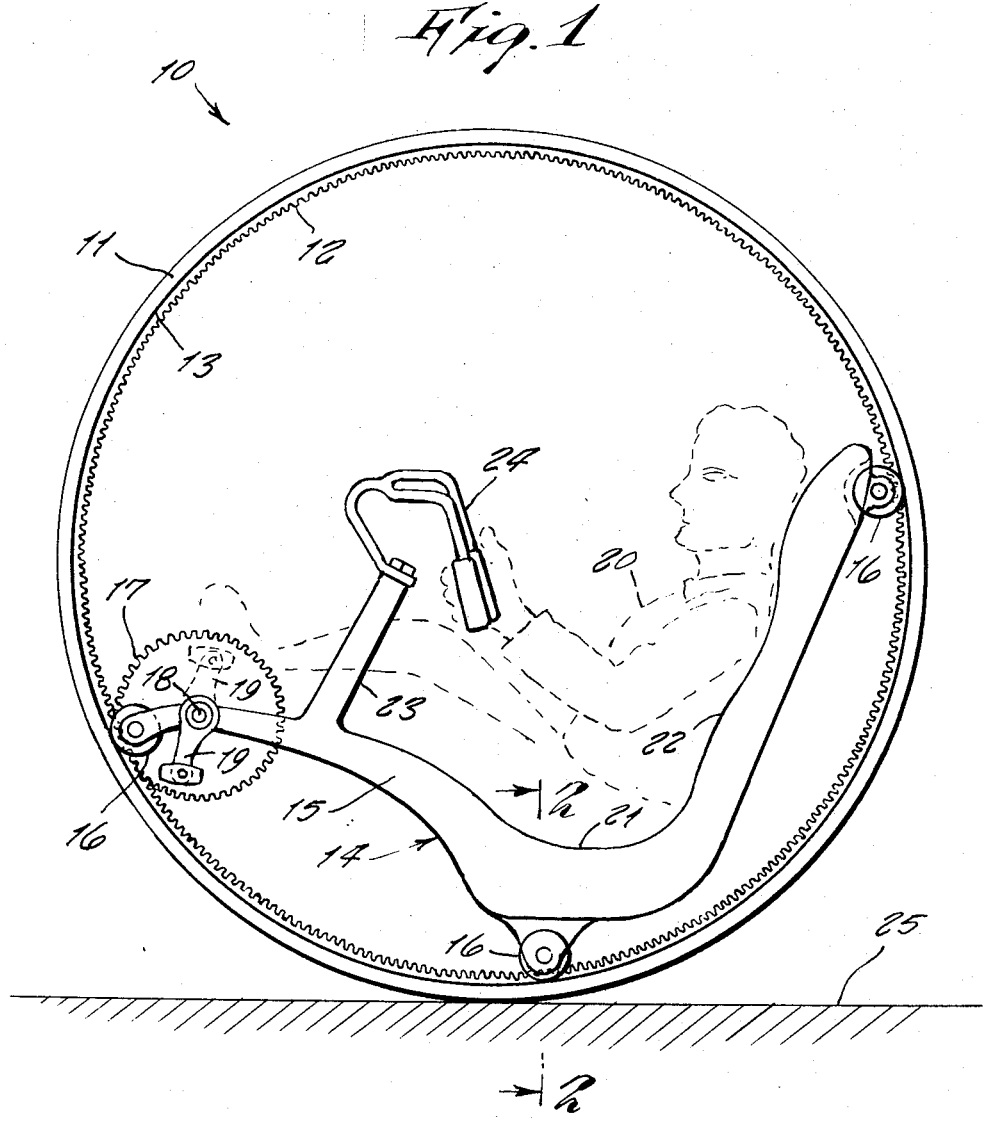
FIG. 1 is a side view of the invention.
Figure 2:
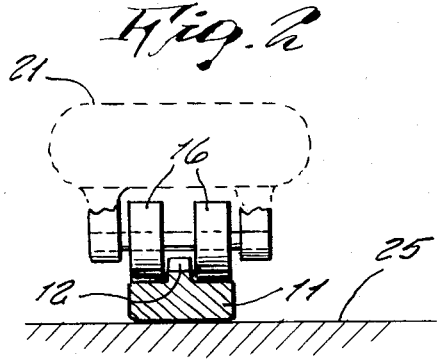
FIG. 2 is an enlarged cross sectional view taken on line 2—2 of FIG. 1.

Referring now to the drawing in detail, the reference numeral 10 represents an orbit mobile according to the present invention, wherein there is a circular ring 11 which upon its outer periphery may or may not include a tire. A toothed track 12 is provided on its inner periphery 13 for a scooter 14 to travel thereupon.

The scooter includes a frame 15 mounted on three sets of wheels 16 that ride on the inner periphery 13. A sprocket 17 engaging the toothed track is mounted on a pin 18 supported in the frame, the pin having foot pedals 19 secured thereto so that a rider 20 can power the scooter. Obviously the frame 15 must be forked around sprocket 17 so to support wheels 16 on each side of the sprocket. The frame includes a saddle portion that forms a seat 21 for the rider and a back rest 22. A post 23 on the frame supports handle bars 24 on which the rider may place his hands. The handle bars could be made pivotable so to thrust a weight toward either side so to steer the orbit mobile toward a right or left direction.

In operative use, the rider sits on the scooter and places his feet on the foot pedals to power the scooter for traveling in the toothed track. Due to gravity, the scooter cannot ride up the track, but rides within the ring orbit thus causing the ring to roll ahead so that the scooter is always within a lower part of the ring, as shown in the drawing. Thus, the ring travels across the ground 25.

While various changes may be made in the detail construction, it is understood that such changes will be within the spirit and scope of the present invention as is defined by the appended claims.

I claim:

1. In an orbit mobile, the combination of circular ring within which a scooter rides so to cause said ring to travel across a surface of a ground, said ring including an outer and an inner periphery, said inner periphery having a toothed track along a center thereof and located between two smooth tracks, said scooter a frame aframe supported on three sets of wheels that ride on said inner periphery; each set comprising a pair of spaced apart wheels, one said wheel travelling in each said track, one said set having a sprocket therebetween, said sprocket affixed on a pin supported on said frame, said sprocket engaging said toothed track said pin having foot pedals secured thereto for being powered by a rider on said scooter, said frame including a seat and a back rest for said rider, said frame including a post supporting handle bars for said rider's hands.

* * * * *